Feb. 15, 1938.  R. W. GLASNER  2,108,059
FRICTIONAL MOTION CONTROLLING ELEMENT
Filed Oct. 30, 1935  2 Sheets-Sheet 1

Inventor:
Rudolph W. Glasner

Feb. 15, 1938. R. W. GLASNER 2,108,059
FRICTIONAL MOTION CONTROLLING ELEMENT
Filed Oct. 30, 1935 2 Sheets-Sheet 2

Inventor:
Rudolph W. Glasner

Patented Feb. 15, 1938

2,108,059

UNITED STATES PATENT OFFICE 2,108,059

FRICTIONAL MOTION CONTROLLING ELEMENT

Rudolph W. Glasner, Chicago, Ill.

Application October 30, 1935, Serial No. 47,442

5 Claims. (Cl. 188—72)

In my co-pending application, Serial Number 32,996, filed July 25, 1935, there is shown and described a combined fluid pressure controlled clutch and brake mechanism, both the clutch and brake embodying a lining carrying member with which the respective friction creating or gripping elements co-operate. In said construction it was necessary, when the lining became worn, and when it was desired to replace or renew the same, to dismantle or remove some of the large parts of the clutch, as well as parts of the press, to permit of the removal of the lining carrying member, which is not only expensive, but time consumed.

It is one of the objects of the present invention to provide in a frictional motion controlling element an improved lining carrying member which is of sectional construction, rendering it possible to remove the same without dismantling any of the large clutch parts or press members.

In an improved structure of this character, the lining carrying member is generally disposed between two opposed gripping members both in a clutch and in a brake construction. A further object of the present invention is to provide improved means for removably securing the lining carrying member in position, and improved means for holding the same against rotation with the gripping or friction creating members when employed in a brake construction, and to maintain the parts against relative rotation when employed in a clutch construction.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a vertical sectional view of a portion of a combined clutch and brake having lining carrying members embodied therein, constructed in accordance with the principles of this invention.

Figure 1:
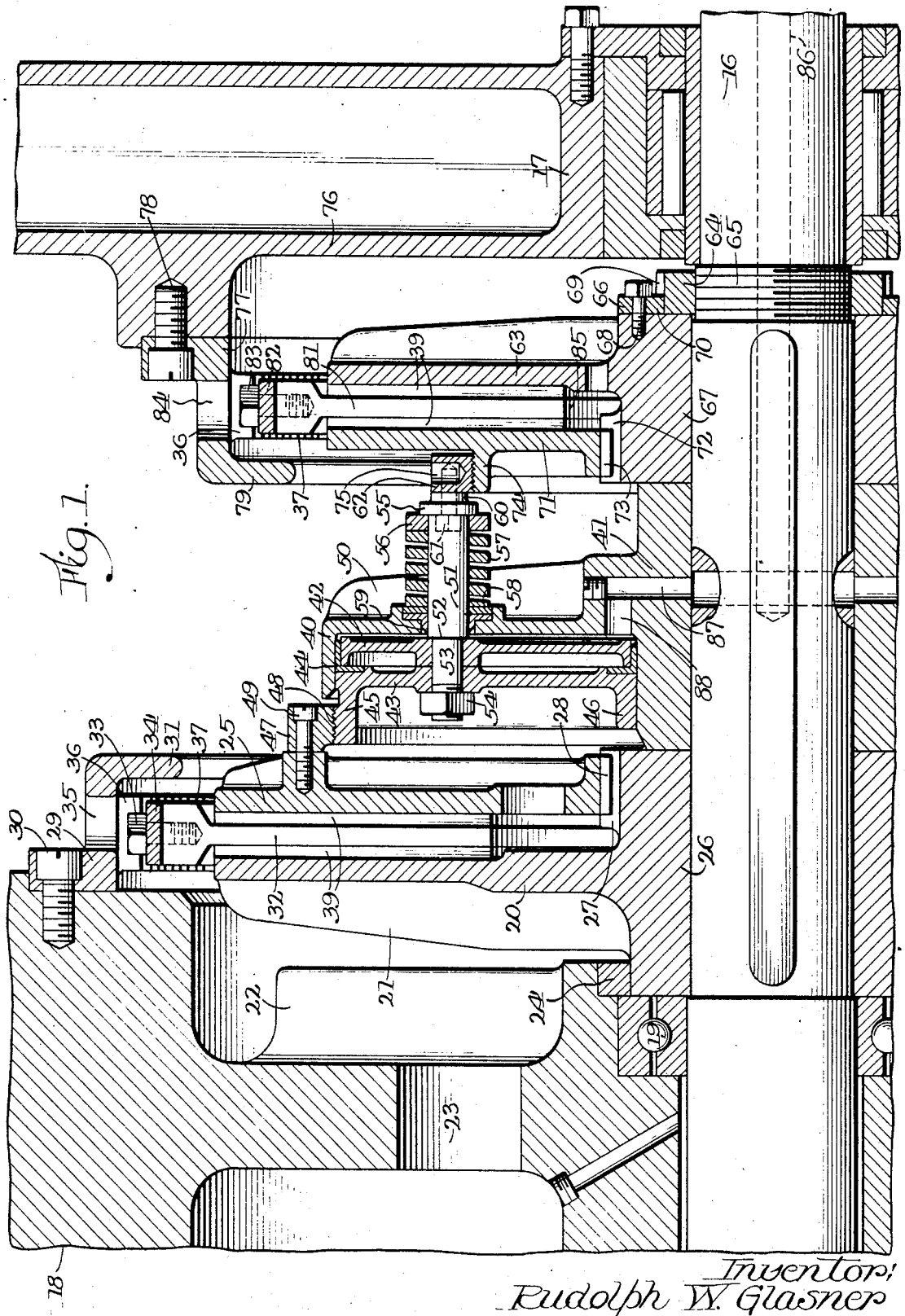

Throughout the specification and claims the structure will be described in connection with a clutch, but it is to be understood that such term is not to be considered as a term of limitation, as the invention is equally applicable to brakes, and the term "clutch" as employed is to be construed to also include a brake.

The invention will be described in connection with a combined clutch and brake mechanism as disclosed in the above referred to co-pending application.

The shaft 16 constitutes the main drive and is journaled in suitable bearings, one of which being shown at 17. A fly wheel 18 constituting a driving element carries a clutch member to be hereinafter described and is mounted upon the shaft 16 for free rotation with respect thereto, roller bearings 19 being preferably arranged between the fly wheel 18 and the shaft 16.

The fly wheel is continuously rotated in any suitable manner. The numeral 20 designates a clutch member which is secured to the shaft 16 for rotation therewith, in any suitable manner, such as by being keyed thereto or by any other suitable fastening device and this clutch member may be provided with radial ribs or fins 21 which co-operate with ribs or fins 22 on the adjacent face of the fly wheel 18, openings 23 being provided in the web or body of the fly wheel in proximity to the fins for creating a current of air to flow over the parts.

A suitable seat or packing gland 24 may also be provided between the fly wheel and the shaft.

Co-operating with the clutch member 20 is another clutch member 25 which is mounted preferably upon the hub 26 of the clutch member 20 and is adapted for lateral movement toward and away from the clutch member 20. To that end the clutch member 25 has a sliding connection with the hub of the clutch member 20, preferably by means of spaced projections 27 on the hub 26 of the clutch member 20 and interengaging projections 28 on the clutch member 25.

Supported by the fly wheel 18 is an annular member 29 secured in position in any suitable manner, such as by means of fastening screws 30. This member 29 is provided with a circumferential flange 31 and the member 29· is of a diameter considerably greater than the diameter of the clutch members 20 and 25.

Disposed between the clutch members 20 and 25 is a lining carrying member which is preferably constructed of a plurality of sections 32 in the form of segments arranged end to end, and these segments are connected together in any desired or suitable manner, so that they may be separated. To that end, there may be provided a plate or member 33 which extends across the respective joints or abutting ends of the segments 32, and fastening screws 34 pass through the plates 33 and into the respective sections 32 so as to detachably secure them together.

The annular members 29 is provided with any desired number of openings 35 which are of a sufficient size and are so disposed with respect to the screws or bolts 34 that access may be had to the latter through the member 29.

The member 29 is also provided on its inner face with a plurality of series of teeth or projections 36, the longitudinal axes of which extend in general directions lengthwise of the axis of the lining carrying member and the teeth are preferably of a substantial extent.

Similar teeth 37 are carried by each of the segments 32 of the lining carrying member and mesh with the respective teeth 36 on the member 29.

The respective teeth being of substantial length permits the lining carrying member to have a lateral movement, such movement being of a limited nature according to the action of the clutch members 20 and 25.

Each of the segments 32 is preferably in the form of an arc so that when assembled there will be provided a central opening 38 through which the shaft 16 and the hub 26 of the clutch member 20 pass, and the opening 38 is of a diameter considerably greater than the diameter of the hub of the clutch member 20.

Figures 2, 3, 4, 5:
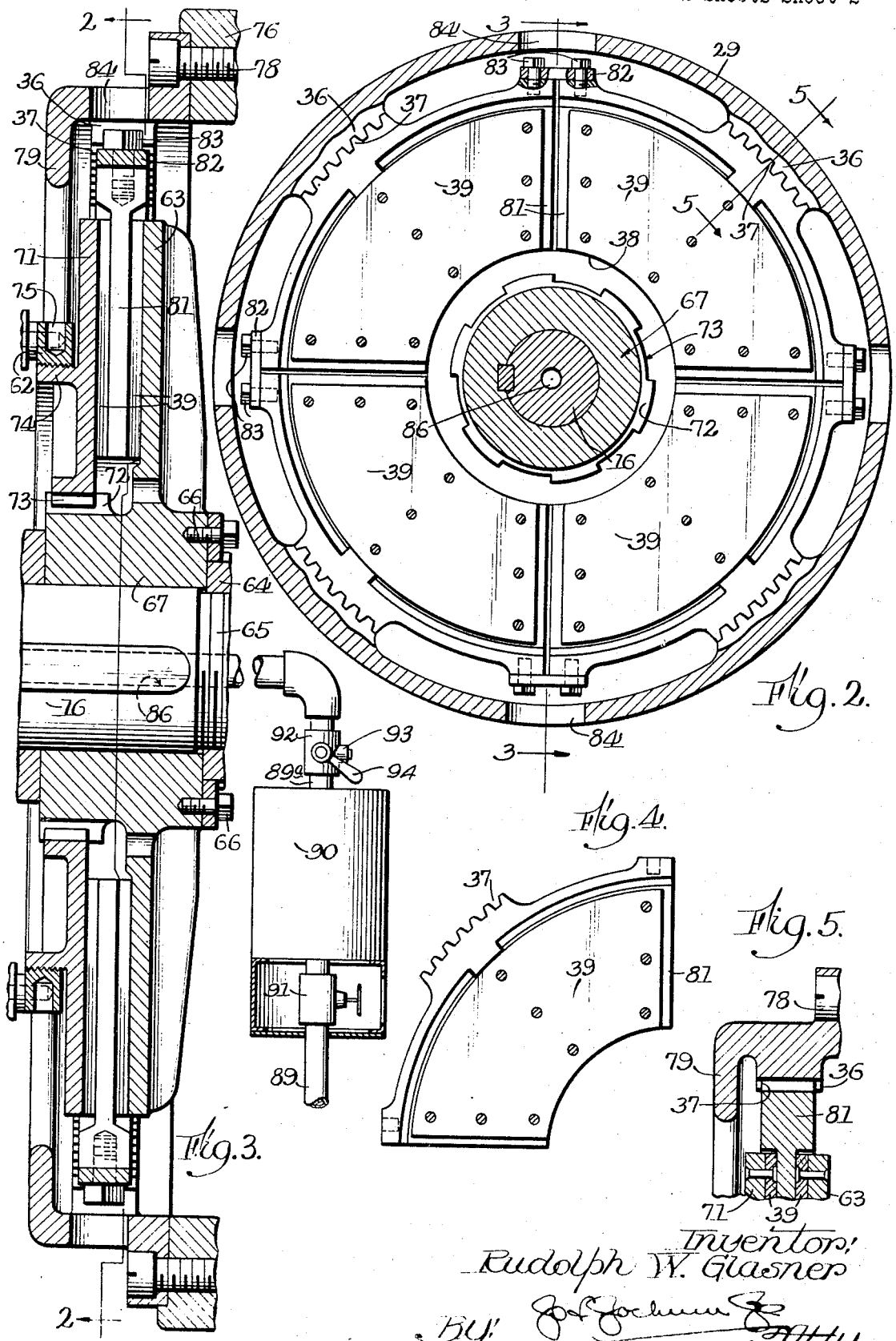
Figure 2 is a detail sectional view on line 2—2, Figure 3, of one of the lining carrying members on a smaller scale.
Figure 3 is a detail sectional view taken on line 3—3, Figure 2, on an enlarged scale, showing an accumulator reservoir or tank for compensating any momentary drop in the fluid pressure in the line so that the clutch will not be affected by such drop.
Figure 4 is a detailed elevation of one of the lining carrying sections.
Figure 5 is a detailed sectional view taken on line 5—5, Figure 2.

Secured to each of the faces of each of the segments 32 of the lining carrying member are lining or friction creating elements 39 which are preferably of a sagmental shape and are recessed in the respective faces of the segment, and this lining is secured in position in any desired or suitable manner. When assembled the segments or sectors of the lining are separated from each other as shown more clearly in Figure 2, sufficiently to allow air to circulate over and between the lining elements to prevent heating the same, thereby prolonging the length of life of the elements, the air currents being created by the fins or ribs 22.

The numeral 40 designates a cylinder which is provided with a hub 41 that is keyed to the shaft 16 for rotation therewith and with the clutch member 20. Within the cylinder 40 is arranged a piston 42, and a cap or closure member 43 is provided for the cylinder. A sealing ring 44 may also be provided for the piston. The cap or closure member is provided with a portion 45 having external threads and a hub 46 journaled upon the hub 41 of the cylinder 40. An annular ring 47 is provided with internal screw threads 48 threaded upon the portion 45 of the member 43. This annular member 47 is fastened to the clutch member 25 in any suitable manner, such as by means of screws or bolts 49, so that when the member 43 which is connected with the piston 42 for reciprocation therewith, is moved laterally, the clutch member 25 will be moved towards or away from the disc or lining carrying member 32, thereby causing the friction elements 39 carried thereby and the clutch members 20—25 to grip the lining carrying member. The lining carrying disc will move laterally, the interengaging teeth 36 and 37 permitting of such lateral movement.

In order to take up the wear of the friction creating elements, the adjustable ring or member 47 is provided.

Fins or blades 50 are provided on the outside of the cylinder 40 to create air currents.

The numeral 51 designates a pin or member which is provided with a shoulder 52 forming a reduced portion 53 which passes through the piston 42 and the member 43, these parts being secured together by means of a nut 54 threaded on to the end of the pin 51, and which nut co-operates with the shoulder 52 to clamp the piston 42 and the member 43 for movement together.

The pin 51, any number of which may be provided, is secured to the piston 42 in any suitable manner, such as by means of key or fastening device (not shown). Each of the pins 51 is provided with a head 55 beneath which a plate 56 is arranged and abuts the head, and 57 designates a coil spring of a predetermined tension which encompasses the pin 51, one end resting against the plate 56 and the other end resting against a washer 58 that abuts the end of the cylinder 40, packing material 59 being provided to form a fluid tight joint.

The head 55 of each of the pins rests against an abutment 60, and 61 designates bolts which pass through portions of the plate 56 (see particularly Figure 1) and engage rings 62 for securing or anchoring the plates 56 in position.

Mounted upon the shaft 16 is a brake member 63, and this member 63 may be secured to the shaft for rotation therewith in any suitable manner, such as by means of a collar 64 threaded upon the portion 65 of the shaft 16, and 66 designates an annular member which is fastened to the hub 67 of the brake member 63 by suitable fastening screws 68, the annular member 66 and the collar 64 being provided with interengaging portions 69—70, which will hold the brake member 63 for rotation with the shaft 16, but will permit of the brake member 63 being adjusted lengthwise of the axis of the shaft 16, for a purpose to be set forth.

A brake member 71 is provided and co-operates with the brake member 63 and is mounted upon the hub 67 of the brake member 63 for rotation therewith, but for longitudinal adjustment with respect thereto, the elements 67 and 71 being provided respectively with interengaging portions 72—73 movable one with respect to the other in directions lengthwise of the hub 67. The brake element 71 is provided with a hub 74 provided with external screw threads upon which the ring 62 is mounted, and this ring 62 is provided with openings 75 extending through the periphery thereof to permit of the insertion of a tool or implement, whereby the ring or member 62 may be rotatably adjusted with respect to the brake element 71, so that when the friction elements become worn, the elements 63 and 71 may be adjusted with respect to each other so as to take up the wear, by rotating the ring 62 and adjusting the same upon the hub or portion 74 of the brake element 71.

Supported by a stationary part of the machine 76 is an annular element 77 being secured in position by means of suitable fastening devices 78 and being provided with a circumferential peripheral flange 79 spaced from the member 76. This member 77 is provided with teeth 80 similar to the teeth 36 on the member 29 and the teeth 80, as well as the teeth 36, are arranged in groups or series spaced from each other circumferentially of the respective members 29 and 77.

A friction or lining carrying element 81, similar in construction to the element 32 which is disposed between the clutch members 20 and 25, is disposed between the brake members 63 and 71, and this element 81 is constructed in section, the proximate ends of adjacent sections being secured together by means of plates 82 and fastening screws 83, access to the latter being had through openings 84 in the member 77.

This lining carrying member 81 is disposed between the brake members 63 and 71 and encompasses the shaft 16, as well as the hub 67 of the brake member 63, the lining carrying element being provided with an opening 85 at its diametric center, and which opening is of a diameter considerably greater than the external diameter of the hub 67. The lining carrying member 81 is also provided with a plurality of sets of teeth, corresponding with the teeth 37 on the lining carrying segments 32, and the teeth on the element 81 mesh with the teeth 80 on the member 77. These teeth are parallel and extending in general directions lengthwise of the axis of the shaft and being of a substantial extent will permit the lining carrying member 81 to have a lateral movement with respect to the member 77, under the influence of the action of the brake members 63 and 71 thereon.

The structure thus described is adapted to be operated by means of fluid pressure admitted through an opening 86 in the shaft 16, and flows from any suitable source of supply, under pressure. Entering the passage 86 in the shaft 16, the fluid pressure will be exerted or manifested through an opening 87 which communicates with an opennig 88, the latter communicating with the interior of the cylinder 40 beneath the piston 42.

When pressure of sufficient extent to overcome the stress of the spring 57 is exerted in the cylinder 40 beneath the piston 42, the latter will be moved against the stress of the spring 57, causing the clutch members 25 and 20 to grip the lining carrying elements 62. When, however, the fluid pressure upon the piston 42 is reduced to such an extent that it will be overcome by the stress created in the spring 57, the brake members 63 and 71 will be moved toward each other to grip the lining carrying element 81, while at the same time the clutch members 25 and 20 will be separated with respect to each other to release their grip upon the lining carrying elements 62, thereby preventing the operation of the clutch while the brake is being rendered active, and vice versa, all as fully described in my aforesaid application.

With the present invention it will be manifest that when the friction creating material, such as the lining or material used which is secured to the elements 82 or 81, becomes worn out or when it is desired to renew or replace the same, the lining carrying elements may be readily removed by simply detaching the respective members 29 and 77 from their supports and then separating the sections constituting the lining carrying elements so as to permit them to be removed, without the necessity of dismantling or removing any of the large parts of the clutch or of the press or machine in connection with which this invention is employed.

After the lining has been replaced, the lining carrying elements may be placed in position and assembled and the respective members 77—29 replaced very readily and without necessitating the services of an expert.

In order to compensate any fluid pressure variation or drop in the supply line 89, and to maintain the proper fluid pressure at which the clutch device is to be operated, there may be provided an accumulator or fluid storage tank or reservoir 90 which is supplied with pressure fluid from the supply line through the pipe 89, and the tank is connected with the passage 86 in the shaft 16 by means of the pipe 89ª, and provided preferably in the pipe 89 is a regulating valve 91.

This valve may be set to any predetermined pressure so that the fluid will be stored in the tank or reservoir 90 under such pressure, and this will insure against momentary dropping of the pressure in the supply line when the clutch is active.

The fluid pressure in the line and the control of the clutch may be effected by means of a valve 92 located between the tank 90 and the clutch mechanism, and said valve is provided with an outlet 93, and an operating or controlling handle 94. This valve 91 is set for a predetermined pressure at which it is desired to actuate the clutch.

Should the fluid pressure rise in the main supply line 89, the regulating valve 91 will permit the fluid pressure to enter the tank 90 only at such pressure for which the valve has been set, thereby eliminating the possibility of the pressure in the tank 90 to rise above the desired point, i. e., that at which the valve 91 is set for operation. This tank will also act as a sufficient pressure supply to provide operating pressure for the clutch for several operations. Should the line pressure in the pipe 89 suddenly drop, or stop entirely, it is possible to operate the clutch several times from the stored pressure contained in the tank. The operation of the tank 90 is given here only for the purpose of conveying a clear understanding of the invention, but this part of the mechanism will constitute the subject matter of a separate application.

While the preferred form of the invention has been herein shown and described, it is to be understood that various changes may be made in the details of construction and the combination and arrangement of the several parts, within the scope of the claims, without departing from the spirit of this invention.

What is claimed as new is:—

1. In combination, a frictional motion controlling element, a lining carrying element with which the first said element cooperates, said lining carrying element being of sectional construction, a lining section carried by and disposed within the confines of the edges of each of the first said sections, and means for separably securing the sections of said element together with the adjacent edges of proximate sections separated to provide air circulation passages therebetween.

2. In combination, a frictional motion controlling element, a lining carrying element with which the first said element cooperates, said lining carrying element being of sectional construction, a lining section carried by and disposed within the confines of the edges of each of the first said sections, and means for separably securing the sections of said element together with the adjacent edges of proximate sections separated to provide air circulation passages therebetween, in combination with means for inducing circulation of air through said passages for cooling said lining.

3. In combination, a frictional motion controlling element, a lining carrying element with which the first said element co-operates, said lining carrying element being of sectional construction, a lining section carried by and disposed within the confines of the edges of each of the first said sections, means for separably securing the sections of said element together with the adjacent edges of proximate sections separated to provide air circulation passages therebetween, and means for maintaining the said lining carrying element against rotation, the last said means embodying a stationary support, and inter-engaging teeth between each of said sections and the said stationary support, said teeth being extended for a substantial distance lengthwise of the axis of said lining carrying element, whereby the last said element will be adapted for a limited free lateral movement.

4. In combination, a frictional motion controlling element, a lining carrying element with which the first said element co-operates, said lining carrying element being of sectional construction, a lining section carried by and disposed within the confines of the edges of each of the first said sections, means for separably securing the sections of said lining carrying element together, the said means comprising connecting members spanning the proximate edges of adjacent sections, fastening bolts anchoring the said members to the respective sections, means for maintaining said lining carrying element against rotation, and a support for a portion of the last said means, there being openings in said support affording free access to said bolts and connecting members.

5. In combination, a frictional motion controlling element, a lining carrying element with which the first said element co-operates, said lining carrying element being of sectional construction, a lining section carried by and disposed within the confines of the edges of each of the first said sections, means for separably securing the sections of said lining carrying element together, each of said sections being of substantially segmental shape, and a series of teeth projecting from the periphery and spaced from the ends of the segment, said teeth extending for a substantial distance in a general direction lengthwise of the axis of the said lining carrying element, in combination with additional teeth with which the first said teeth co-operate for maintaining the said lining carrying element against rotation but permitting a limited lateral movement of the lining carrying element.

RUDOLPH W. GLASNER.